(12) United States Patent
Kaneko et al.

(10) Patent No.: US 8,596,661 B2
(45) Date of Patent: *Dec. 3, 2013

(54) THRUST SLIDING BEARING AND COMBINATION MECHANISM OF THE THRUST SLIDING BEARING AND A PISTON ROD

(75) Inventors: Ryohei Kaneko, Kanagawa (JP); Kouichi Morishige, Kanagawa (JP)

(73) Assignee: Oiles Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/635,539

(22) PCT Filed: Feb. 17, 2011

(86) PCT No.: PCT/JP2011/000867
§ 371 (c)(1),
(2), (4) Date: Sep. 17, 2012

(87) PCT Pub. No.: WO2011/114619
PCT Pub. Date: Sep. 22, 2011

(65) Prior Publication Data
US 2013/0009376 A1 Jan. 10, 2013

(30) Foreign Application Priority Data
Mar. 17, 2010 (JP) ................................. 2010-061340

(51) Int. Cl.
*B60G 15/00* (2006.01)
(52) U.S. Cl.
USPC .................................................. 280/124.155
(58) Field of Classification Search
USPC .................... 280/124.155, 124.154, 124.146, 280/124.147; 267/195, 220; 384/216, 223, 384/420–427, 125

See application file for complete search history.

(56) References Cited

U.S. PATENT DOCUMENTS

| 4,699,530 A * | 10/1987 | Satoh et al. ................... 384/609 |
| 8,256,965 B2 * | 9/2012 | Kaneko et al. ................ 384/420 |
| 2009/0180719 A1 * | 7/2009 | Miyata et al. ................. 384/147 |

FOREIGN PATENT DOCUMENTS

| JP | 08-326758 | 12/1996 |
| JP | 2004-225754 | 8/2004 |
| JP | 2004-263773 | 9/2004 |
| JP | 2005-133788 | 5/2005 |
| JP | 2006-308003 | 11/2006 |
| JP | 2008-014463 | 1/2008 |
| JP | 2008-202703 | 9/2008 |
| JP | 2009-297830 | 12/2009 |

OTHER PUBLICATIONS

International Search Report for PCT/JP2011/000867 mailed Mar. 15, 2011.
Microfilm of the Specification and Drawings Annexed to the Request of Japanese Utility Model Application No. 116760/1980 (Laid-open No. 040749/1982), Mar. 5, 1982, p. 3, line 14 to p. 8, line 13; fig. 2.

* cited by examiner

*Primary Examiner* — Faye M. Fleming
(74) *Attorney, Agent, or Firm* — Nixon & Vanderhye P.C.

(57) ABSTRACT

A thrust sliding bearing 1 includes a synthetic resin-made annular bearing body 4 having an annular upper surface 2 and an annular engaging projection 3; a synthetic resin-made annular bearing body 6; a synthetic resin-made thrust sliding bearing piece 7; an annular upper cover 9 having engaging projections 8 which engage the engaging projection 3 of the bearing body 4; and an annular metal plate 15 interposed between the bearing body 6 and the annular upper cover 9.

6 Claims, 6 Drawing Sheets

THRUST SLIDING BEARING AND COMBINATION MECHANISM OF THE THRUST SLIDING BEARING AND A PISTON ROD

This application is the U.S. national phase of International Application No. PCT/JP2011/000867 filed 17 Feb. 2011 which designated the U.S. and claims priority to JP 2010-061340 filed 17 Mar. 2010, the entire contents of each of which are hereby incorporated by reference.

TECHNICAL FIELD

The present invention relates to a thrust sliding bearing, and more particularly to a thrust sliding bearing which is suitably incorporated as a sliding bearing of a strut-type suspension (Macpherson type) in a four-wheeled vehicle, as well as a combination mechanism of the thrust sliding bearing and a piston rod.

BACKGROUND ART

A strut-type suspension used for a front wheel of a four-wheeled vehicle generally has a structure in which a strut assembly incorporating a hydraulic shock absorber in an outer cylinder integrated with a main shaft is combined with a coil spring. Among such suspensions, there is a type in which when the strut assembly rotates together with the coil spring in the steering operation, the piston rod of the strut assembly rotates, and a type in which the piston rod does not rotate. In either type, there are cases where, instead of a rolling bearing, a synthetic resin-made thrust sliding bearing is used between a mechanism for mounting the strut assembly to the vehicle body and an upper spring seat member of the coil spring, so as to allow smooth rotation of the strut assembly.

PRIOR ART DOCUMENTS

Patent Documents

[Patent Document 1] JP-A-8-326758
[Patent Document 2] JP-A-2004-263773
[Patent Document 3] JP-A-2004-225754
[Patent Document 4] JP-A-2008-202703

SUMMARY OF THE INVENTION

Problems that the Invention is to Solve

Incidentally, in the mechanism for mounting the strut assembly to the vehicle body, a mounting plate is used for supporting one end of the piston rod of the hydraulic shock absorber, but in the case of such a mounting mechanism, the mounting plate for supporting the end of the piston rod is not only required, but the structure becomes complex, so that high cost is entailed.

With respect to such a problem, Patent Document 4 proposes a thrust sliding bearing and a combination mechanism of the thrust sliding bearing and a piston rod which make it possible to support one end of the piston rod instead of the mounting plate of the mechanism for mounting the strut assembly to the vehicle body, thereby making it possible to simplify the mounting mechanism and attain a cost reduction.

The thrust sliding bearing according to this proposal is comprised of a synthetic resin-made annular bearing body having an annular upper surface and an annular engaging projection; a synthetic resin-made annular another bearing body which is superposed on this bearing body so as to be relatively rotatable about an axis of that bearing body and has an annular lower surface opposed to the annular upper surface of the bearing body; thrust sliding bearing means interposed between the annular upper surface of the bearing body and the annular lower surface of the other bearing body and having at least one of a lower surface and an upper surface which is in slidable contact with at least one of the annular upper surface of the bearing body and the annular lower surface of the other bearing body; an annular upper cover having an annular engaging projection engaging the annular engaging projection of the bearing body; and an annular metal plate interposed between an annular upper surface of the other bearing body and a lower surface of the annular upper cover such that a lower surface of the annular metal plate is brought into contact with the annular upper surface of the other bearing body and an upper surface thereof is brought into contact with the lower surface of the annular upper cover. In this thrust sliding bearing, the annular metal plate is provided with an annular inner peripheral surface having a smaller diameter than inside diameters of annular inner peripheral surfaces of the both bearing bodies and the annular upper cover, thereby effectively overcoming the above-described problem.

However, since the proposed thrust sliding bearing at the flat annular metal plate is arranged to be mounted to the threaded portion of the piston rod through the nut, there is a possibility that if a large force is applied to the annular metal plate through the piston rod, the annular metal plate can be deformed, generating abnormal noise in the relative rotation of the piston rod.

The present invention has been devised in view of the above-described aspects, and its object is to provide a thrust sliding bearing and a combination mechanism of the thrust sliding bearing and a piston rod which, even if a large force is applied to the annular metal plate through the piston rod, make it possible to prevent the deformation of the annular metal plate and reduce the generation of abnormal noise in the relative rotation of the piston rod.

Means for Solving the Problems

A thrust sliding bearing in accordance with the present invention comprises: a synthetic resin-made annular first bearing body having an annular upper surface and a first engaging projection; a synthetic resin-made annular second bearing body which is superposed on said first bearing body so as to be relatively rotatable about an axis of said first bearing body and has an annular lower surface opposed to the annular upper surface of said first bearing body; thrust sliding bearing means interposed between the annular upper surface of said first bearing body and the annular lower surface of said second bearing body and having at least one of a lower surface and an upper surface which is in slidable contact with at least one of the annular upper surface of said first bearing body and the annular lower surface of said second bearing body; an annular upper cover having a second engaging projection engaging the first engaging projection of said first bearing body; and an annular metal plate interposed between an annular upper surface of said second bearing body and a lower surface of said annular upper cover such that a lower surface of said annular metal plate is brought into contact with the annular upper surface of said second bearing body and an upper surface thereof is brought into contact with the lower surface of said annular upper cover, wherein said annular upper cover includes a hollow cylindrical portion having the second engaging projection and a first annular plate portion formed integrally with the hollow cylindrical portion, and said annular metal plate includes a second annular plate portion which is in contact with the annular upper surface of said second bearing body and an annular lower surface of the first annular plate portion of said annular upper cover, a third annular plate portion disposed in a through hole defined by an inner peripheral surface of the first annular plate portion of said annular upper cover, and an annular stepped portion whose one side is formed integrally with the second annular plate portion and whose other side is integrally formed with the third annular plate portion, the third annular plate portion being provided with an annular inner peripheral surface having a smaller diameter than inside diameters of annular inner peripheral surfaces of said first and second bearing bodies.

According to the thrust sliding bearing in accordance with the present invention, said annular metal plate includes the second annular plate portion which is in contact with the annular upper surface of said second bearing body and the annular lower surface of the first annular plate portion, the third annular plate portion disposed in the through hole defined by the inner peripheral surface of the first annular plate portion, and the annular stepped portion whose one side is formed integrally with the second annular plate portion and whose other side is integrally formed with the third annular plate portion. Therefore, the annular stepped portion functions like a reinforcing portion (rib) of the annular metal plate, with the result that, even if a large force is applied to the annular metal plate through the piston rod, it is possible to prevent the deformation of the annular metal plate and reduce the generation of abnormal noise in the relative rotation of the piston rod due to the deformation of the annular metal plate.

In a preferred example, the annular metal plate has an annular projection which is formed integrally with a lower surface of the second annular plate portion and engages an annular outer peripheral surface of said second bearing body, so as to hold a radial relative position of said annular metal plate and said second bearing body. In another preferred example, the annular upper cover has an annular inner peripheral surface with which an annular outer peripheral surface of the annular metal plate is brought into contact. In such an example as well, the annular metal plate can be positioned with respect to the annular upper cover, with the result that the annular metal plate need not be fixed to the second bearing body and the annular upper cover by using an adhesive or the like. The fixation of the annular metal plate to the second bearing body and the annular upper cover may in some cases be effected by using an adhesive or the like. Instead of this or in conjunction therewith, however, the fixation may be effected by the fitting of a projection to a through hole or a recess. The numbers of the projection and the through hole or the recess may be respectively singular, but it suffices if they are two or more.

In the present invention, the annular outer peripheral surface of said second bearing body may have a large-diameter outer peripheral surface portion, a small-diameter outer peripheral surface portion which is smaller in diameter than the large-diameter outer peripheral surface portion, an annular surface interposed between the large-diameter outer peripheral surface portion and the small-diameter outer peripheral surface portion, and the annular projection may be adapted to engage the small-diameter outer peripheral surface portion.

The thrust sliding bearing means may have a synthetic resin-made thrust sliding bearing piece which is separate from the first bearing body and the second bearing body, or, alternatively, the thrust sliding bearing means may have a synthetic resin-made thrust sliding bearing portion which is integrally formed on at least one of the first bearing body and the second bearing body.

The both bearing bodies may be formed of a synthetic resin including at least one of polyacetal resin, polyamide resin, thermoplastic polyester resin, polyolefin resin, polycarbonate resin, and fluororesin. In the case where the thrust sliding bearing means is embodied by the thrust sliding bearing piece, such a thrust sliding bearing piece may be formed of a synthetic resin including at least one of polyacetal resin, polyamide resin, thermoplastic polyester resin, polyolefin resin, and fluororesin. As for each of the first and second bearing bodies, a synthetic resin similar to the synthetic resin constituting the thrust sliding bearing piece can be used, but particularly a synthetic resin which exhibits satisfactory friction characteristics when combined with the synthetic resin used for the thrust sliding bearing piece is used. To illustrate examples of desirable combinations thereof, it is possible to cite the following combinations for the thrust sliding bearing piece and the first and second bearing bodies: a combination of polyacetal resin and polyamide resin; a combination of a polyolefin resin, particularly polyethylene resin, and polyacetal resin; a combination of polyacetal resin and a thermoplastic polyester resin, particularly polybutylene terephthalate resin; and a combination of polyacetal resin and polyacetal resin.

The annular upper cover in a preferred example is formed of a thermoplastic synthetic resin such as polyacetal resin, polyamide resin, and polybutylene terephthalate resin, but may alternatively be formed of a reinforced thermoplastic synthetic resin in which such a thermoplastic synthetic resin is reinforced by an inorganic filler such as glass fiber, glass powder, glass beads, carbon fiber, and the like. The annular metal plate in a preferred example is formed of a steel plate made of such as steel, stainless steel, or the like, but may alternatively be formed of a nonferrous alloy plate made of such as a copper alloy, a titanium alloy, or the like.

A combination mechanism of a thrust sliding bearing and a piston rod in accordance with the invention, or a combination mechanism for use in a strut-type suspension in a four-wheeled vehicle in a preferred example, comprises: the thrust sliding bearing according to any one of the above-described aspects; and a piston rod of a shock absorber. Here, said piston rod includes a large-diameter portion disposed in a through hole defined by the annular inner peripheral surfaces of said first and second bearing bodies, a small-diameter portion whose diameter is smaller than the large-diameter portion and which is formed integrally with the large-diameter portion and is disposed in a through hole defined by the inner peripheral surface of said annular metal plate, and a threaded portion formed on the small-diameter portion. Here, said annular metal plate at the third annular plate portion is clamped between an annular stepped surface between the large-diameter portion and the small-diameter portion of said piston rod and an annular surface of a nut threadedly engaged with the threaded portion. Such an annular metal plate is preferably one which is formed by subjecting a hot-rolled steel plate (SPHC: steel plate hot commercial) to press forming. In this case, at least clamped surfaces of the third annular plate portion, which are clamped by the annular stepped surface between the large-diameter portion and the small-diameter portion of said piston rod and the annular surface of said nut, are preferably coated by being plated with a ductile soft metal such as zinc, copper, or tin. As such metal plating is provided, the annular stepped surface and the annular surface of the nut, on the one hand, and the clamped surfaces of third annular plate portion, on the other hand, are brought into substantially total contact with each other. Hence, as a result of the fact that it is possible to avoid local contact and disperse the stress when it is applied in the axial direction by the piston rod, damage to the third annular plate portion, such as a crack, does not occur.

Advantages of the Invention

According to the present invention, it is possible to provide a thrust sliding bearing and a combination mechanism of the thrust sliding bearing and a piston rod which, even if a large force is applied to the annular metal plate through the piston rod, make it possible to prevent the deformation of the annular metal plate and reduce the generation of abnormal noise in the relative rotation of the piston rod due to the deformation of the annular metal plate.

MODE FOR CARRYING OUT THE INVENTION

Hereafter, a more detailed description will be given of the mode for carrying out the invention on the basis of a preferred embodiment illustrated in the drawings. It should be noted that the present invention is not limited to the embodiment.

In FIGS. 1 to 6, a thrust sliding bearing 1 of this embodiment includes a synthetic resin-made annular bearing body 4 having an annular upper surface 2 and an annular engaging projection 3; a synthetic resin-made annular bearing body 6 which is superposed on the bearing body 4 so as to be relatively rotatable about an axis O of the bearing body 4 in an R direction and has an annular lower surface 5 opposed to the annular upper surface 2 of the bearing body 4; an annular synthetic resin-made thrust sliding bearing piece 7 which is separate from the bearing body 4 and the bearing body 6 and serves as a thrust sliding bearing means interposed between the annular upper surface 2 of the bearing body 4 and the annular lower surface 5 of the bearing body 6; an annular upper cover 9 having a plurality of, i.e., in this embodiment three, engaging projections (engaging pawls) 8 which engage the engaging projection 3 of the bearing body 4; and an annular metal plate 15 having an annular plate portion 14 interposed between an annular upper surface 10 of the bearing body 6 and a lower surface 13 of the annular upper cover 9 such that its lower surface 11 is brought into contact with the annular upper surface 10 of the bearing body 6 and its upper surface 12 is brought into contact with the lower surface 13 of the annular upper cover 9.

Figure 1:
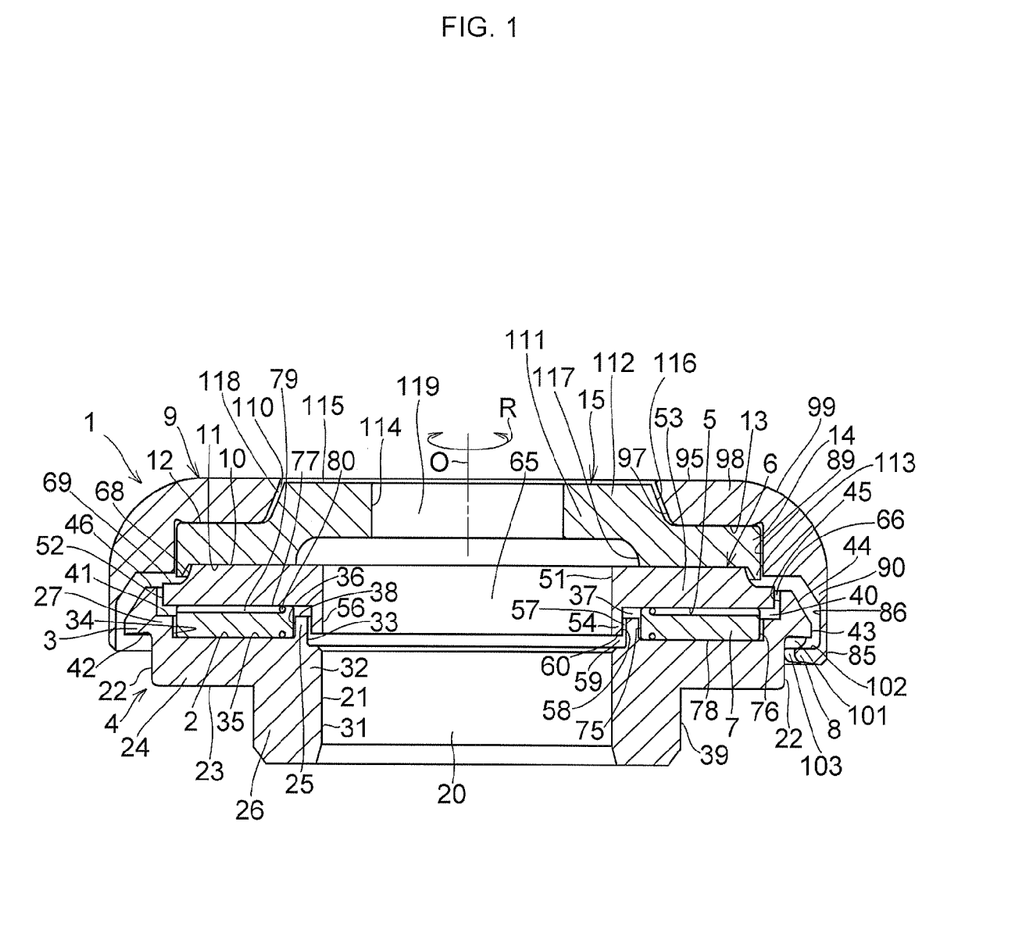
FIG. 1 is a front cross-sectional view of an embodiment of the invention.
Figure 2:
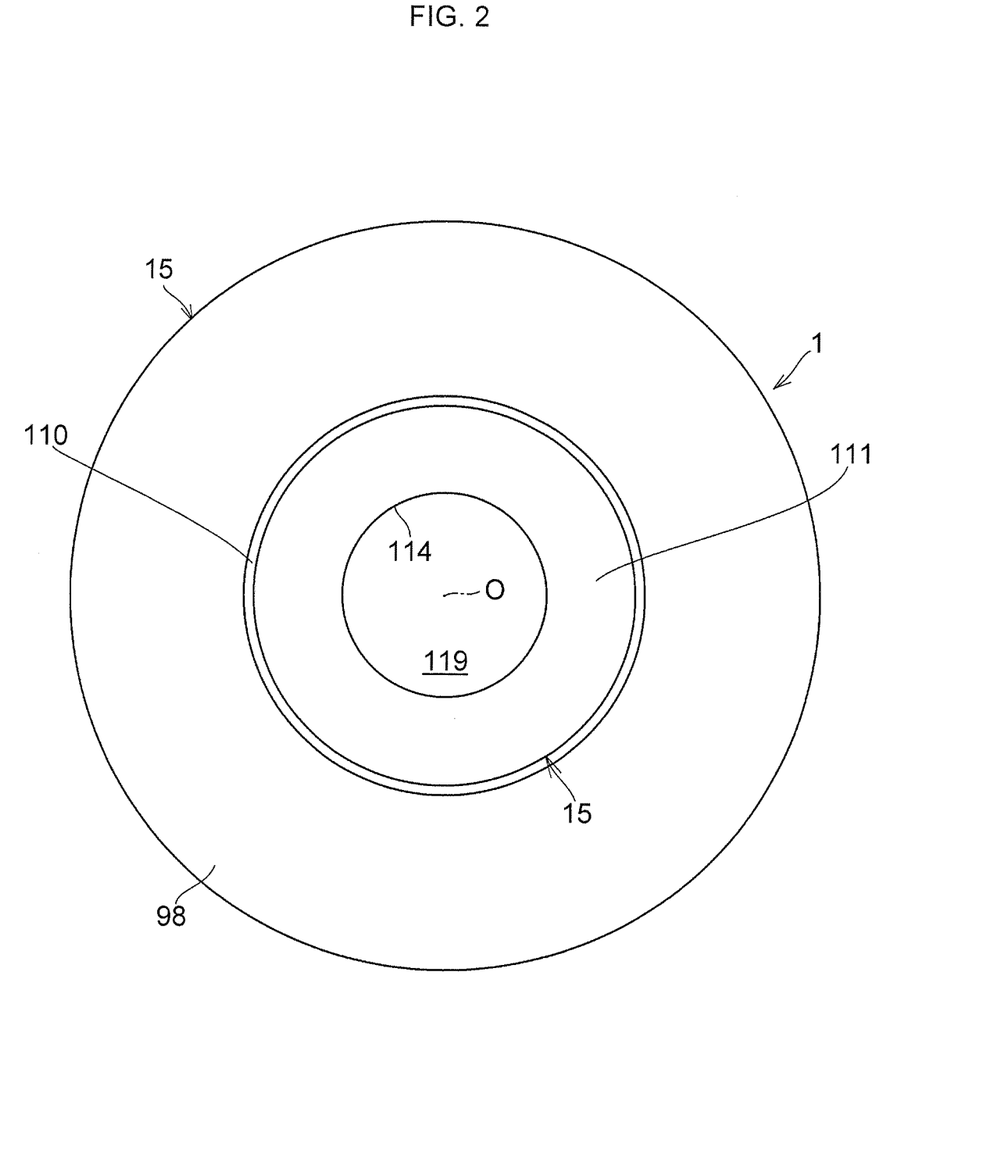
FIG. 2 is a plan view of the embodiment shown in FIG. 1.

The bearing body 4 which has a through hole 20 in its center includes an annular lower bearing main body 24 having the annular upper surface 2, an annular inner peripheral surface 21, an annular outer peripheral surface 22, and an annular lower surface 23; an annular inner projecting portion 25 formed integrally with the annular upper surface 2 of the lower bearing main body 24 and projecting from the annular upper surface 2 toward the annular lower surface 5; a hollow cylindrical portion 26 formed integrally with the annular lower surface 23 of the lower bearing main body 24 and projecting downward from an inner portion of the annular lower surface 23; and an annular outer projecting portion 27 formed integrally with the annular upper surface 2 of the lower bearing main body 24 and disposed radially outwardly of the inner projecting portion 25.

The through hole 20 of the bearing body 4 is defined by the annular inner peripheral surface 21 and an annular inner peripheral surface 31 of the hollow cylindrical portion 26 which is flush with the annular inner peripheral surface 21. The inner projecting portion 25, which is formed integrally with the annular upper surface 2 on a radially outer side of an annular stepped portion 32 defined by the annular inner peripheral surface 21 and an inner portion of the annular upper surface 2 adjacent to the annular inner peripheral surface 21, includes a cylindrical inner peripheral surface 33 having a larger diameter than the diameter of the annular inner peripheral surface 21; a cylindrical outer peripheral surface 36 defining an annular recess 35 in cooperation with a cylindrical inner peripheral surface 34 of the outer projecting portion 27 and the annular upper surface 2; and an annular top surface 38 opposing the annular lower surface 5 with an annular gap 37 therebetween. The hollow cylindrical portion 26 has an annular outer peripheral surface 39, and the outer projecting portion 27 having the inner peripheral surface 34 includes an annular top surface 41 which is flush with the annular top surface 38 and opposes the annular lower surface 5 with an annular gap 40 therebetween. The engaging projection 3 formed integrally with the outer projecting portion 27 includes an annular lower surface 42, an annular outer peripheral surface 43 adjacent to the annular lower surface 42, an annular inclined outer peripheral surface 44 adjacent to the annular outer peripheral surface 43, an annular inner peripheral surface 45, and an annular top surface 46 adjacent to and sandwiched between the annular inner peripheral surface 45 and the annular inclined outer peripheral surface 44.

The bearing body 6 includes an upper bearing main body 53 which has the annular lower surface 5, the annular upper surface 10, an annular inner peripheral surface 51, and an annular outer peripheral surface 52 and is thinner-walled than the lower bearing main body 24, as well as an annular projecting portion 54 formed integrally with an inner portion of the annular lower surface 5 of the upper bearing main body 53 and suspended downward from the annular lower surface 5 toward the annular stepped portion 32 on the inner side of the annular upper surface 2.

The annular projecting portion 54 includes an annular inner peripheral surface 56 which is flush with the annular inner peripheral surface 51, an outer peripheral surface 58 having a smaller diameter than the inner peripheral surface 33 and opposed to the inner peripheral surface 33 with an annular gap 57 therebetween, and an annular top surface 60 opposed to the upper surface of the annular stepped portion 32 on the inner side of the annular upper surface 2 with an annular gap 59 therebetween, such that the gap 57 communicates with the gap 37 and the gap 59, and communicates with the recess 35 through the gap 37, while communicating with the outside through the gap 59. Thus, the recess 35 communicates with the outside through an inner labyrinth consisting of the gap 37, the gap 57, and the gap 59. The annular inner peripheral surfaces 51 and 56 define a central through hole 65 of the bearing body 6 having the same diameter as the through hole 20, and the annular outer peripheral surface 52 includes a large-diameter outer peripheral surface portion 67 opposed to the annular inner peripheral surface 45 with a gap 66 therebetween, a small-diameter outer peripheral surface portion 68 having a smaller diameter than the large-diameter outer peripheral surface portion 67, and an annular surface 69 interposed between the large-diameter outer peripheral surface portion 67 and the small-diameter outer peripheral surface portion 68 and extending perpendicularly to the axis O.

Figure 3:
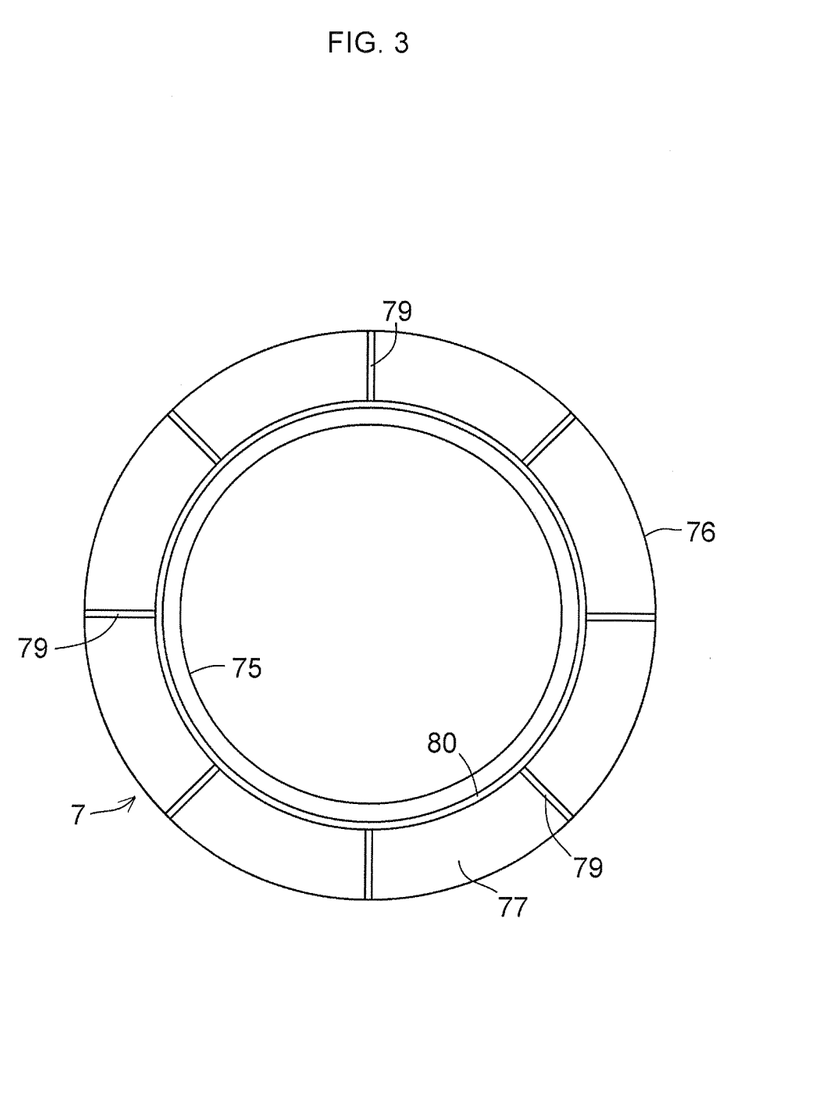
FIG. 3 is a plan view of a thrust sliding bearing piece in the embodiment shown in FIG. 1.
Figure 4:
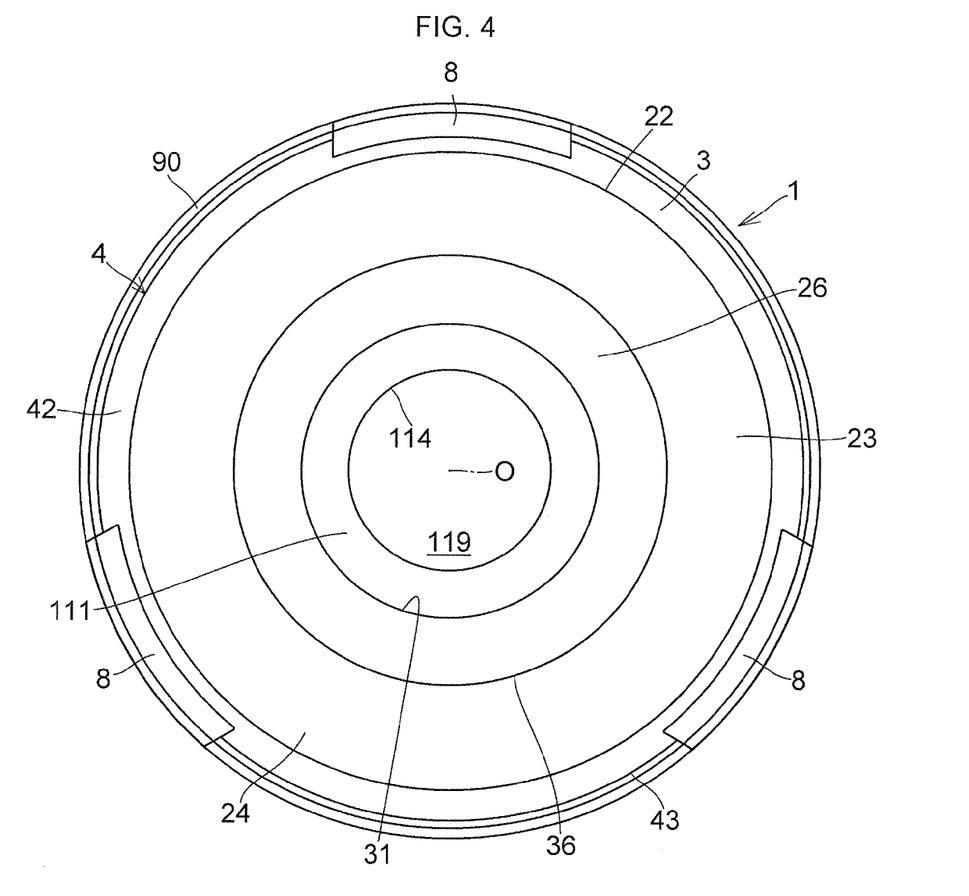
FIG. 4 is a bottom view of the embodiment shown in FIG. 1.
Figure 5:
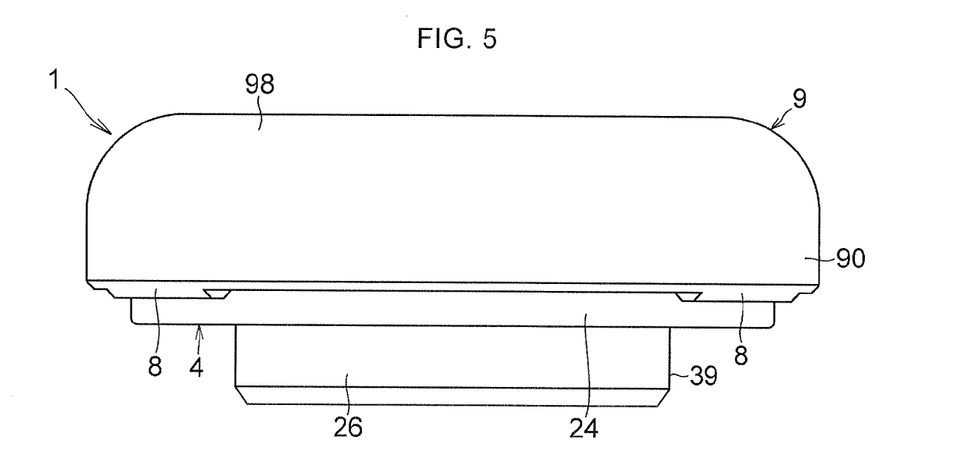
FIG. 5 is a front elevational view of the embodiment shown in FIG. 1.
Figure 6:
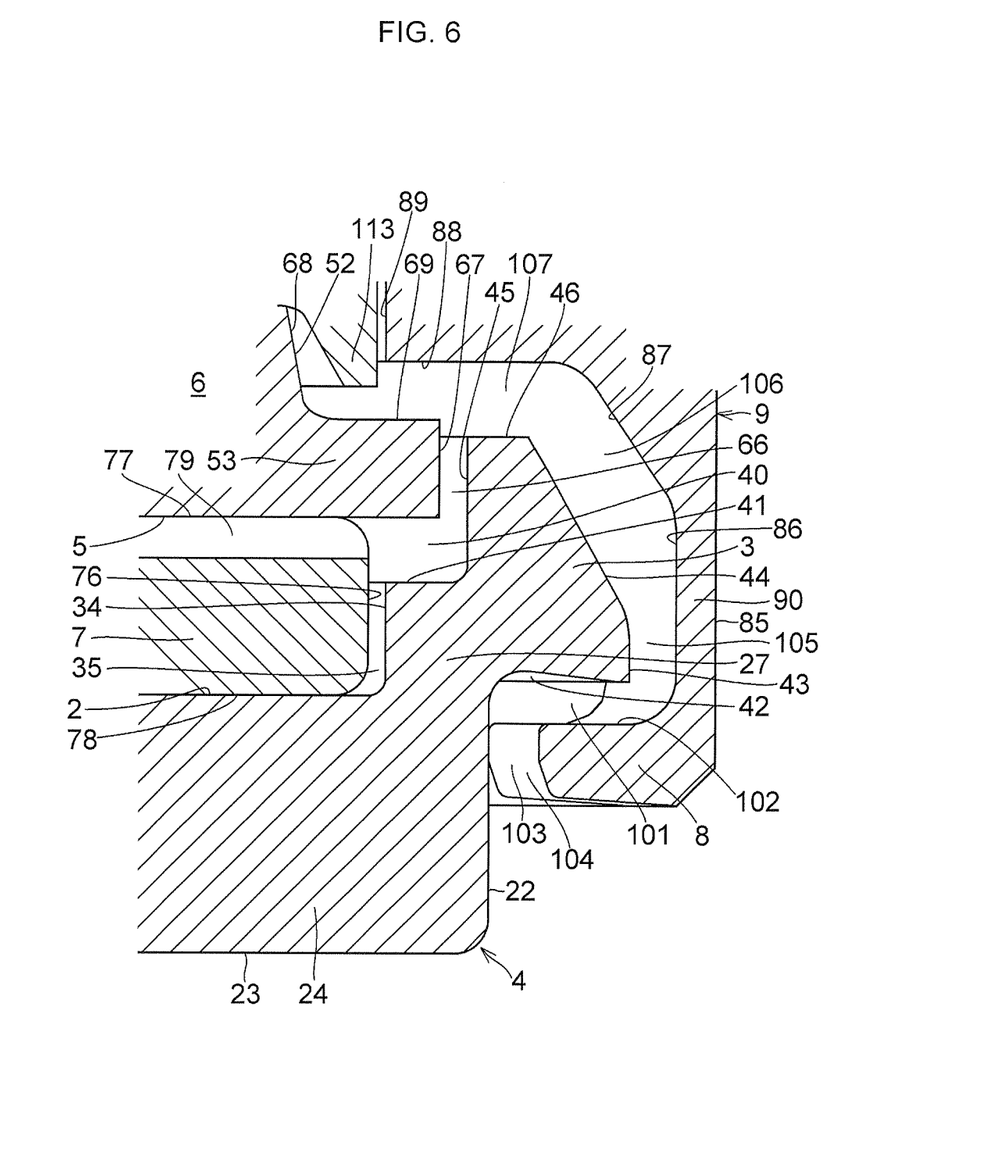
FIG. 6 is a partially enlarged cross-sectional view of the embodiment shown in FIG. 1.

The disk-shaped thrust sliding bearing piece 7 is disposed in the recess 35 between the inner projecting portion 25 and the outer projecting portion 27 in the radial direction and is radially positioned as its annular inner peripheral surface 75 and its outer peripheral surface 76 are respectively brought into contact with the outer peripheral surface 36 of the inner projecting portion 25 and the inner peripheral surface 34 of the outer projecting portion 27 so as to be relatively rotatable in the R direction. This disk-shaped thrust sliding bearing piece 7 has a flat annular upper surface 77 and lower surface 78 which are respectively brought into contact with the flat annular lower surface 5 and annular upper surface 2 relatively slidably in the R direction, as well as a plurality of radially extending grooves 79 provided in each of the upper surface 77 and the lower surface 78 and an annular groove 80 provided on an inner side of each of the upper surface 77 and the lower surface 78 and communicating with the plurality of grooves 79. In the same way as the annular lower surface 5 and the annular upper surface 2, the upper surface 77 and the lower surface 78 extend flatly and perpendicularly to the axis O, and a lubricant such as grease is adapted to be accumulated in the plurality of grooves 79 and the groove 80 in each of the upper surface 77 and the lower surface 78. With respect to the respective grooves 79 of the lower surface 78, the respective grooves 79 of the upper surface 77 are formed at identical positions concerning the R direction, or by being displaced at fixed or various angles, e.g., at equal angles of 22.5° in the case of eight grooves.

The annular upper cover 9 includes a hollow cylindrical portion 90 having the engaging projections 8 and including a cylindrical outer peripheral surface 85, a cylindrical inner peripheral surface 86, an annular inclined inner peripheral surface 87 continuous with the inner peripheral surface 86, an annular lower surface 88 continuous with the inclined inner peripheral surface 87, and a cylindrical inner peripheral surface 89 having a smaller diameter than the inner peripheral surface 86 and continuous with the lower surface 88, as well as an annular plate portion 98 formed integrally with the hollow cylindrical portion 90 and having the flat annular lower surface 13 and an annular upper surface 95 both extending perpendicularly to the axis O and an inclined inner peripheral surface 97 having a smaller diameter than the inner peripheral surface 89 and continuous with the upper surface 95 and the lower surface 13. The outer peripheral surface 85 is continuous with the upper surface 95 through an annular curved surface 99.

The engaging projections 8 each having an annular upper surface 102 opposing the annular lower surface 42 with a gap 101 therebetween so as to be capable of being brought into contact with the annular lower surface 42 are formed integrally with the inner peripheral surface 86 at the lower end portion of the hollow cylindrical portion 90 in such a manner as to project radially inwardly from the inner peripheral surface 86 with a radial top surface 104 opposing the annular outer peripheral surface 22 with a gap 103 therebetween and to be spaced apart from each other at equiangular intervals concerning the R direction, e.g., at equiangular intervals of 120° in the case of the three engaging projections. The inner peripheral surface 86, the inclined inner peripheral surface 87, and the annular lower surface 88 are respectively opposed to the annular outer peripheral surface 43, the annular inclined outer peripheral surface 44, and the annular top surface 46 with gaps 105, 106, and 107. The gap 103 communicating with the outside communicates with the recess 35 through the gap 101, the gap 105, the gap 106, the gap 107, the gap 66, and the gap 40 which communicate with each other. Thus, the recess 35 communicates with the outside through an outer labyrinth consisting of the gaps 103, 101, 105, 106, 107, 66, and 40.

The annular metal plate 15 includes, in addition to the annular plate portion 14, an annular plate portion 111 which is disposed in a through hole 110 defined by the inclined inner peripheral surface 97 of the annular plate portion 98 and is coated with a ductile soft metal such as zinc, copper, or tin, an annular stepped portion 112 whose one side is integrally formed with the annular plate portion 14 and whose other side is integrally formed with the annular plate portion 111, and an annular projection 113 which is formed integrally with an outer portion of the lower surface 11 of the annular plate portion 14 and is adapted to engage the small-diameter outer peripheral surface portion 68 of the annular outer peripheral surface 52 of the bearing body 6, so as to hold the radial relative position of the annular metal plate 15 and the bearing body 6. The annular metal plate 15 in its entirety may be coated with a ductile soft metal such as zinc, copper, or tin.

The annular plate portion 111 has an annular inner peripheral surface 114 having a smaller diameter than the inside diameters of the annular inner peripheral surfaces 21 and 31 of the bearing body 4 and the annular inner peripheral surfaces 51 and 56 of the bearing body 6 and a flat annular upper surface 115 extending perpendicularly to the axis O substantially flush with the upper surface 95 or from a position slightly lower than the upper surface 95. The annular stepped portion 112 having an annular inclined outer surface 116 and an annular circular arc-shaped inner surface 117 extends from the annular plate portion 14 to the annular plate portion 111 by being inclined radially inwardly and upwardly, such that a very small gap 118 is created between the annular inclined outer surface 116 and the inclined inner peripheral surface 97. The annular inner peripheral surface 114 defines a central through hole 119 of the annular metal plate 15 which is disposed with the same axis O as that of the through holes 65 and 20.

In the above-described thrust sliding bearing 1, the bearing body 4 and the annular upper cover 9 are superposed on and coupled to each other by means of the snap-fit type engagement fitting of the engaging projections 8 with respect to the engaging projection 3 making use of the flexibility of the synthetic resin, such that the thrust sliding bearing piece 7, the bearing body 6, and the annular metal plate 15 which are superposed one on top of another in the vertical direction are sandwiched therebetween. In the relative rotation of the bearing body 4 with respect to the bearing body 6 about the axis O in the R direction, low-friction sliding between the upper surface 77 of the thrust sliding bearing piece 7 and the annular lower surface 5 of the upper bearing main body 53 or low-friction sliding between the lower surface 78 of the thrust sliding bearing piece 7 and the annular upper surface 2 of the lower bearing main body 24 is caused to take place, thereby allowing the relative rotation of the bearing body 4 with respect to the bearing body 6 about the axis O in the R direction to be effected with extremely low frictional resistance.

Figure 7:
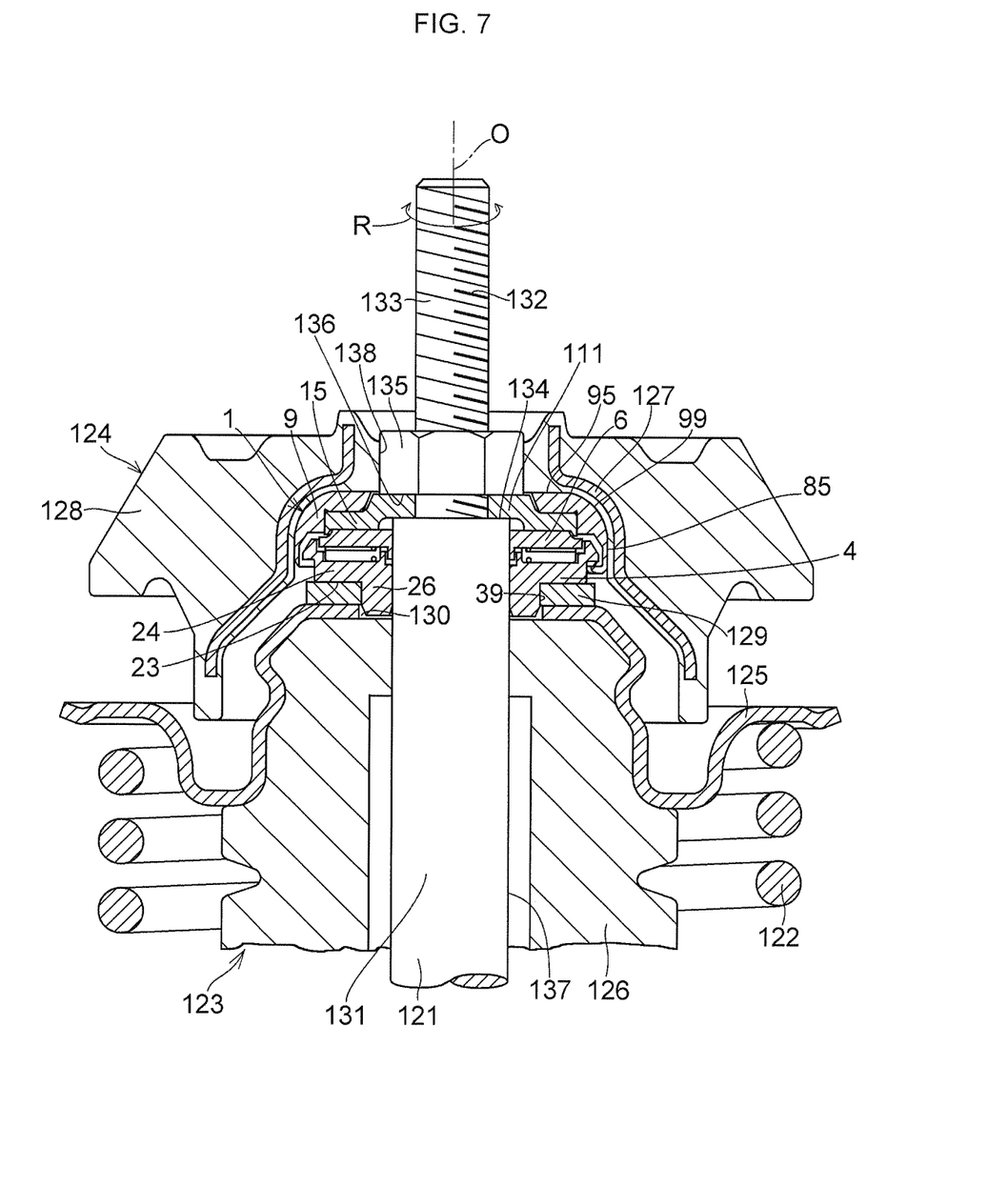
FIG. 7 is a cross-sectional view of an embodiment in which the embodiment shown in FIG. 1 is used in a strut-type suspension.

As shown in FIG. 7, such a thrust sliding bearing 1 is used when a strut-type suspension 123 of a vehicle, which includes a hydraulic shock absorber (not shown) having a piston rod 121 therein and a coil spring 122 disposed so as to surround such a hydraulic shock absorber, is mounted to a vehicle body by means of a mounting mechanism 124.

The strut-type suspension 123 of a vehicle, e.g., a four-wheeled vehicle, includes, in addition to the hydraulic shock absorber and the coil spring 122, an upper spring seat member 125 for receiving one end of the coil spring 122 and a bump stopper 126 disposed so as to surround the piston rod 121. The mounting mechanism 124 includes a resilient member 128 with a core metal 127 embedded therein, as well as a spacer member 129 interposed between the upper spring seat member 125 and the annular lower surface 23 of the lower bearing main body 24. The thrust sliding bearing 1 is disposed between the resilient member 128 of the mounting mechanism 124 and the upper spring seat member 125 of the strut-type suspension 123 through the spacer member 129. Moreover, a lower end portion of the hollow cylindrical portion 26 is inserted in a central through hole 130 of the upper spring seat member 125, to be thereby positioned concerning a direction perpendicular to the axis O by the upper spring seat member 125, and the inner peripheral surface of the spacer member 129 is in contact with the outer peripheral surface 39 of the hollow cylindrical portion 26. The resilient member 128 enveloping the thrust sliding bearing 1 is disposed in contact with the outer peripheral surface 85, the upper surface 95, and the curved surface 99 of the annular upper cover 9.

The piston rod 121 includes a large-diameter portion 131 disposed by being passed through the through holes 20 and 65, a small-diameter portion 132 whose diameter is smaller than the large-diameter portion 131 and which is formed integrally with the large-diameter portion 131 and is disposed by being passed through the through hole 119, and a threaded portion 133 formed on the small-diameter portion 132. The annular metal plate 15 at its annular plate portion 111 coated with a ductile metal such as zinc, copper, or tin is clamped between, on the one hand, an annular stepped surface 134 between the large-diameter portion 131 and the small-diameter portion 132 of the piston rod 121 and, on the other hand, an annular surface 136 of a nut 135 threadedly engaged with the threaded portion 133.

The large-diameter portion 131 at its outer peripheral surface 137 is in contact with the annular inner peripheral surfaces 21 and 31 rotatably in the R direction, and an annular inner peripheral surface 138 of the resilient member 128 is in contact with the outer peripheral surface of the nut 135. The bearing body 6 and the annular upper cover 9 are held by the resilient member 128 by means of the annular metal plate 15 whose annular plate portion 111 is clamped between the annular stepped surface 134 and the annular surface 136, so as not to rotate in the R direction.

In the above-described combination mechanism of the thrust sliding bearing 1 and the piston rod 121, when the coil spring 122 is rotated about the axis O in the R direction by the steering operation, the bearing body 4 is similarly rotated relatively in the R direction with respect to the bearing body 6. This rotation of the bearing body 4 is effected smoothly by the thrust sliding bearing piece 7 disposed between the bearing body 4 and the bearing body 6, so that the steering operation is performed without resistance.

According to the thrust sliding bearing 1, the annular metal plate 15, which is provided with the annular inner peripheral surface 114 having a smaller diameter than the diameters of the annular inner peripheral surfaces 21, 31, 51, and 56 of the bearing bodies 4 and 6 and the annular upper cover 9, is interposed between the annular upper surface 10 of the bearing body 6 and the lower surface 13 of the annular upper cover 9 such that its lower surface 11 is brought into contact with the annular upper surface 10 of the bearing body 6 and its upper surface 12 is brought into contact with the lower surface 13 of the annular upper cover 9. Therefore, one end of the piston rod 121 can be supported by such an annular metal plate 15, and it is possible to eliminate the mounting plate for supporting one end of the piston rod 121 in the mechanism for mounting the strut assembly to the vehicle body, thereby making it possible to simplify the mounting mechanism and attain cost reduction.

In addition, according to the thrust sliding bearing 1, since the annular metal plate 15 has the annular plate portion 14 which is in contact with the annular upper surface 10 and the annular lower surface 13, the annular plate portion 111 disposed in the through hole 110 defined by the inclined inner peripheral surface 97 of the annular plate portion 98, and the annular stepped portion 112 whose one side is integrally formed with the annular plate portion 14 and whose other side is integrally formed with the annular plate portion 111, the annular stepped portion 112 functions like a reinforcing portion of the annular metal plate 15. As a result, even if a large vertical force is applied to the annular metal plate 15 through the piston rod 121, it is possible to prevent the deformation of the annular metal plate 15 and reduce the generation of abnormal noise in the relative rotation of the piston rod 121 in the R direction. Moreover, since the annular plate portion 111 is coated with a ductile soft metal such as zinc, copper, or tin, the annular stepped surface 134 and the annular surface 136, on the one hand, and the clamped surfaces of the annular plate portion 111 clamped by the annular stepped surface 134 and the annular surface 136, on the other hand, are brought into substantially total contact with each other. Hence, as a result of the fact that it is possible to avoid local contact and disperse the stress when it is applied in the axial direction by the piston rod 121, damage to the annular plate portion 111, such as a crack, does not occur.

In addition, according to the thrust sliding bearing 1, since the recess 35 communicates with the outside through the outer labyrinth consisting of the gaps 103, 101, 105, 106, 107, 66, and 40, it is possible to effectively prevent the ingress of muddy water and the like into the recess 35, and it is possible to maintain the smooth rotation of the bearing body 4 in the R direction with respect to the bearing body 6 through the thrust sliding bearing piece 7 over extended periods of time.

The above-described thrust sliding bearing 1 is an example in which the thrust sliding bearing piece 7 which is separate from the bearing body 4 and the bearing body 6 is provided as the thrust sliding bearing means, but a synthetic resin-made annular thrust sliding bearing portion which is formed integrally with at least one of the annular upper surface 2 of the bearing body 4 and the annular lower surface 5 of the bearing body 6 may alternatively be provided as the thrust sliding bearing means.

DESCRIPTION OF REFERENCE NUMERALS

1: thrust sliding bearing
2: annular upper surface
3: engaging projection
4: bearing body
5: annular lower surface
6: bearing body
7: thrust sliding bearing piece
8: engaging projection
9: annular upper cover
10: annular upper surface
11, 13: lower surface 12: upper surface
14: annular plate portion
15: annular metal plate

The invention claimed is;

1. A thrust sliding bearing comprising: a synthetic resin-made annular first bearing body having an annular upper surface and a first engaging projection; a synthetic resin-made annular second bearing body which is superposed on said first bearing body so as to be relatively rotatable about an axis of said first bearing body and has an annular lower surface opposed to the annular upper surface of said first bearing body; thrust sliding bearing means interposed between the annular upper surface of said first bearing body and the annular lower surface of said second bearing body and having at least one of a lower surface and an upper surface which is in slidable contact with at least one of the annular upper surface of said first bearing body and the annular lower surface of said second bearing body; an annular upper cover having a second engaging projection engaging the first engaging projection of said first bearing body; and an annular metal plate interposed between an annular upper surface of said second bearing body and a lower surface of said annular upper cover such that a lower surface of said annular metal plate is brought into contact with the annular upper surface of said second bearing body and an upper surface thereof is brought into contact with the lower surface of said annular upper cover, wherein said annular upper cover includes a hollow cylindrical portion having the second engaging projection and a first annular plate portion formed integrally with the hollow cylindrical portion, and said annular metal plate includes a second annular plate portion which is in contact with the annular upper surface of said second bearing body and an annular lower surface of the first annular plate portion of said annular upper cover, a third annular plate portion disposed in a through hole defined by an inner peripheral surface of the first annular plate portion of said annular upper cover, and an annular stepped portion whose one side is formed integrally with the second annular plate portion and whose other side is integrally formed with the third annular plate portion, the third annular plate portion being provided with an annular inner peripheral surface having a smaller diameter than inside diameters of annular inner peripheral surfaces of said first and second bearing bodies.

2. The thrust sliding bearing according to claim 1, wherein said annular metal plate has an annular projection which is formed integrally with a lower surface of the first annular plate portion and engages an annular outer peripheral surface of said second bearing body, so as to hold a radial relative position of said annular metal plate and said second bearing body.

3. The thrust sliding bearing according to claim 2, wherein the annular outer peripheral surface of said second bearing body has a large-diameter outer peripheral surface portion, a small-diameter outer peripheral surface portion which is smaller in diameter than the large-diameter outer peripheral surface portion, an annular surface interposed between the large-diameter outer peripheral surface portion and the small-diameter outer peripheral surface portion, and the annular projection is adapted to engage the small-diameter outer peripheral surface portion.

4. A combination mechanism of a thrust sliding bearing and a piston rod, comprising: the thrust sliding bearing according to claim 1; and a piston rod of a shock absorber, wherein said piston rod includes a large-diameter portion disposed in a through hole defined by the annular inner peripheral surfaces of said first and second bearing bodies, a small-diameter portion whose diameter is smaller than the large-diameter portion and which is formed integrally with the large-diameter portion and is disposed in a through hole defined by the inner peripheral surface of said annular metal plate, and a threaded portion formed on the small-diameter portion, and wherein said annular metal plate at the third annular plate portion is clamped between an annular stepped surface between the large-diameter portion and the small-diameter portion of said piston rod and an annular surface of a nut threadedly engaged with the threaded portion.

5. The combination mechanism of a thrust sliding bearing and a piston rod according to claim 4, wherein, in the third annular plate portion of said annular metal plate, clamped surfaces thereof which are clamped by the annular stepped surface between the large-diameter portion and the small-diameter portion of said piston rod and the annular surface of said nut are coated with a ductile soft metal such as zinc, copper, or tin.

6. The combination mechanism of a thrust sliding bearing and a piston rod according to claim 4 for use in a strut-type suspension in a four-wheeled vehicle.

\* \* \* \* \*